US009895797B2

(12) United States Patent
Smith

(10) Patent No.: US 9,895,797 B2
(45) Date of Patent: Feb. 20, 2018

(54) TOOL CABINET HAVING INTEGRAL AIR LINES

(71) Applicant: Shawn Smith, Tulsa, OK (US)

(72) Inventor: Shawn Smith, Tulsa, OK (US)

( * ) Notice: Subject to any disclaimer, the term of this patent is extended or adjusted under 35 U.S.C. 154(b) by 0 days.

(21) Appl. No.: 14/490,267

(22) Filed: Sep. 18, 2014

(65) Prior Publication Data

US 2015/0267847 A1  Sep. 24, 2015

Related U.S. Application Data

(60) Provisional application No. 61/879,407, filed on Sep. 18, 2013.

(51) Int. Cl.
*B25H 3/00* (2006.01)
*B25H 3/02* (2006.01)
*B25H 1/12* (2006.01)
*F04B 35/06* (2006.01)
*F16K 15/00* (2006.01)

(52) U.S. Cl.
CPC ............... *B25H 3/00* (2013.01); *B25H 1/12* (2013.01); *B25H 3/006* (2013.01); *B25H 3/02* (2013.01); *F04B 35/06* (2013.01); *F16K 15/00* (2013.01); *Y10T 137/8376* (2015.04); *Y10T 137/87877* (2015.04)

(58) Field of Classification Search
CPC .. F04B 35/06; B25H 3/00; B25H 3/02; B25H 1/12; B25H 3/006; Y10T 137/87877
See application file for complete search history.

(56) References Cited

U.S. PATENT DOCUMENTS

| | | | |
|---|---|---|---|
| 4,389,166 A | 6/1983 | Harvey et al. | |
| 4,574,620 A * | 3/1986 | Cohl | G01M 3/26 73/47 |
| 4,688,308 A * | 8/1987 | Alvarez | B60P 3/14 29/33 G |
| 5,009,252 A * | 4/1991 | Faughn | F16L 37/113 137/614.04 |
| 6,305,049 B1 * | 10/2001 | Koch | B25H 3/00 137/899 |
| 7,494,327 B2 | 2/2009 | Etter et al. | |
| 8,084,992 B2 | 12/2011 | Scheffy et al. | |
| 8,091,585 B1 * | 1/2012 | Cooper | A61M 37/0076 137/883 |
| 8,415,921 B1 | 4/2013 | Young et al. | |
| 2005/0156564 A1 | 7/2005 | Krieger | |
| 2007/0063624 A1 * | 3/2007 | Liao | B25H 3/04 312/282 |
| 2011/0043085 A1 * | 2/2011 | Parisena | B25H 1/04 312/249.13 |

* cited by examiner

*Primary Examiner* — Atif Chaudry
(74) *Attorney, Agent, or Firm* — Global Intellectual Property Agency, LLC; Daniel Enea

(57) ABSTRACT

A tool cabinet having integral pneumatic air lines. The present invention is a tool cabinet having an inlet valve, which is adapted to have an air compressor attached thereto, and a plurality of outlet valves, which are adapted to have a variety of different pneumatic tools connected thereto. The present invention also has a plurality of holders disposed on the exterior surface of the tool cabinet to hold the pneumatic tools. The present invention is otherwise designed to function as a traditional tool cabinet, including having a plurality of drawers, hooks, slots, or other such structures adapted to hold and organize tools.

7 Claims, 2 Drawing Sheets

TOOL CABINET HAVING INTEGRAL AIR LINES

CROSS REFERENCE TO RELATED APPLICATION

This application claims the benefit of U.S. Provisional Application No. 61/879,407 filed on Sep. 18, 2013. The above identified patent application is herein incorporated by reference in its entirety to provide continuity of disclosure.

BACKGROUND OF THE INVENTION

Field of the Invention

The present invention relates to tool cabinets. More specifically, the present invention relates to tool cabinets having integral accessories for tools.

Mechanics and other individuals who regularly work with pneumatic tools often have to constantly switch which tools are attached to the air compressor depending upon the task at hand. The constant swapping of pneumatic tools leads to wear and tear on the couplings, requiring individuals to regularly replace these components. Furthermore, when these individuals swap out various tools, they tend to leave the replaced tool on the ground or in an otherwise unattended location, which can result in the tool becoming damaged or lost. Therefore, there is a need in the prior art for a device that allows for multiple pneumatic tools to be simultaneously connected to an air compressor, thereby allowing multiple different pneumatic tools to be used without requiring that they be repeatedly connected and disconnected to the air compressor, and that also holds the pneumatic tools in a convenient, organized manner.

Description of the Prior Art

Devices have been disclosed in the prior art that relate to tool cabinets and tool boxes having integral accessories. These include devices that have been patented and published in patent application publications. These devices generally relate to tool cabinets or tool boxes having integral power sources. The following is a list of devices deemed most relevant to the present disclosure, which are herein described for the purposes of highlighting and differentiating the unique aspects of the present invention, and further highlighting the drawbacks existing in the prior art.

Tool cabinets and tool boxes having integral power sources and outlets, thereby allowing electrically-powered tools to be powered therefrom, have been described in the prior art. Although these types of devices are adapted to power electric power tools, these devices are not adapted to power pneumatic tools. This is disadvantageous because many mechanics and other such individuals rely heavily on pneumatic tools. Furthermore, the couplings between a pneumatic tool and an air hose are more prone to damage than an electric power tool's plug and the electrical outlet. Therefore, it is more desired to leave a pneumatic tool connected to its air hose and minimize the number of times one connects and disconnects the coupling. However, when an individual has only a single air compressor, he or she is nonetheless forced to constantly swap the pneumatic tools in and out in order to handle different types of tasks due to the presence of only a single coupling.

Portable air compressors having a storage compartment for tools and other articles are also known in the prior art. While these devices allow for pneumatic tools to be kept together with the air compressor that is used to power them, they nonetheless do not allow for multiple pneumatic tools to be attached thereto and used simultaneously. Furthermore, these devices generally lack the traditional functionality of tool cabinets, which generally comprise multiple drawers, hooks, and/or other holding mechanisms for conveniently storing a large number of tools in an organized manner.

The present invention substantially diverges in design elements from the prior art and consequently it is clear that there is a need in the art for an improvement to existing tool cabinet devices. In this regard the instant invention substantially fulfills these needs.

SUMMARY OF THE INVENTION

In view of the foregoing disadvantages inherent in the known types of tool cabinets now present in the prior art, the present invention provides a new tool cabinet having integral air lines wherein the same can be utilized for providing convenience for the user when regularly using multiple different pneumatic tools\.

It is therefore an object of the present invention to provide a new and improved tool cabinet device that has all of the advantages of the prior art and none of the disadvantages.

It is another object of the present invention to provide a tool cabinet having integral air lines that allows for multiple pneumatic tools to be attached thereto and used simultaneously.

Another object of the present invention is to provide a tool cabinet having integral air lines that stores the user's pneumatic tools in a convenient and organized manner, preventing the tools from being left haphazardly and unattended around one's work area.

Yet another object of the present invention is to provide a tool cabinet having integral air lines, wherein the air lines extend through the interior of the tool cabinet, protecting them from damage or other types of interference and therefore minimizing the amount of upkeep that is required to maintain the air lines.

Yet another object of the present invention is to provide a tool cabinet having integral air lines that is additionally adapted to keep the user's non-pneumatic tools stored in an organized and convenient manner, as with a conventional tool cabinet.

Still yet another object of the present invention is to provide a tool cabinet having integral air lines that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
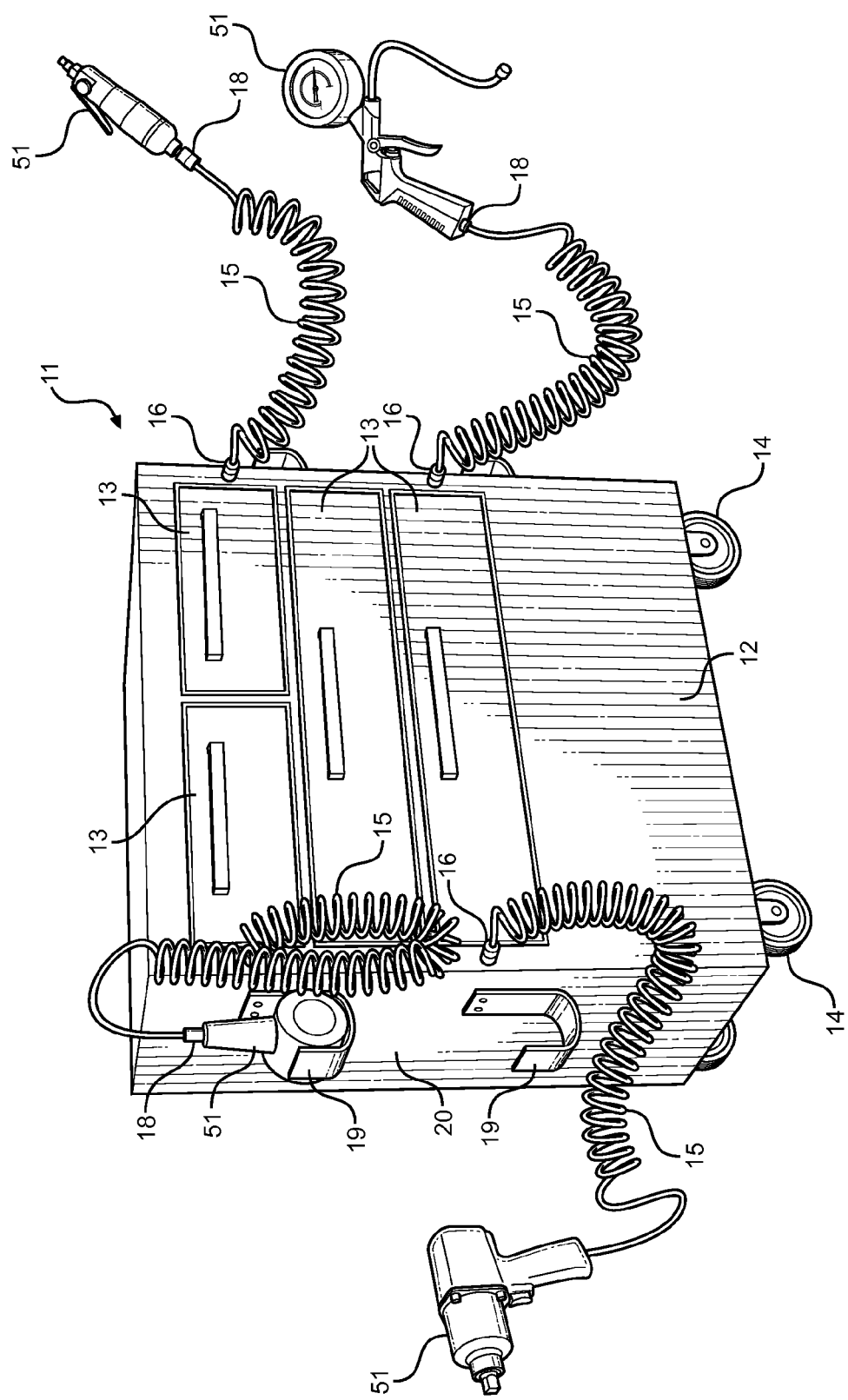
FIG. 1 shows a perspective view of the present invention having a plurality of pneumatic tools connected thereto.

Reference is made herein to the attached drawings. Like reference numerals are used throughout the drawings to depict like or similar elements of the tool cabinet having integral air lines. For the purposes of presenting a brief and clear description of the present invention, the preferred embodiment will be discussed as used for interchangeably utilizing a number of different pneumatic tools. The figures are intended for representative purposes only and should not be considered to be limiting in any respect.

Figure 2:
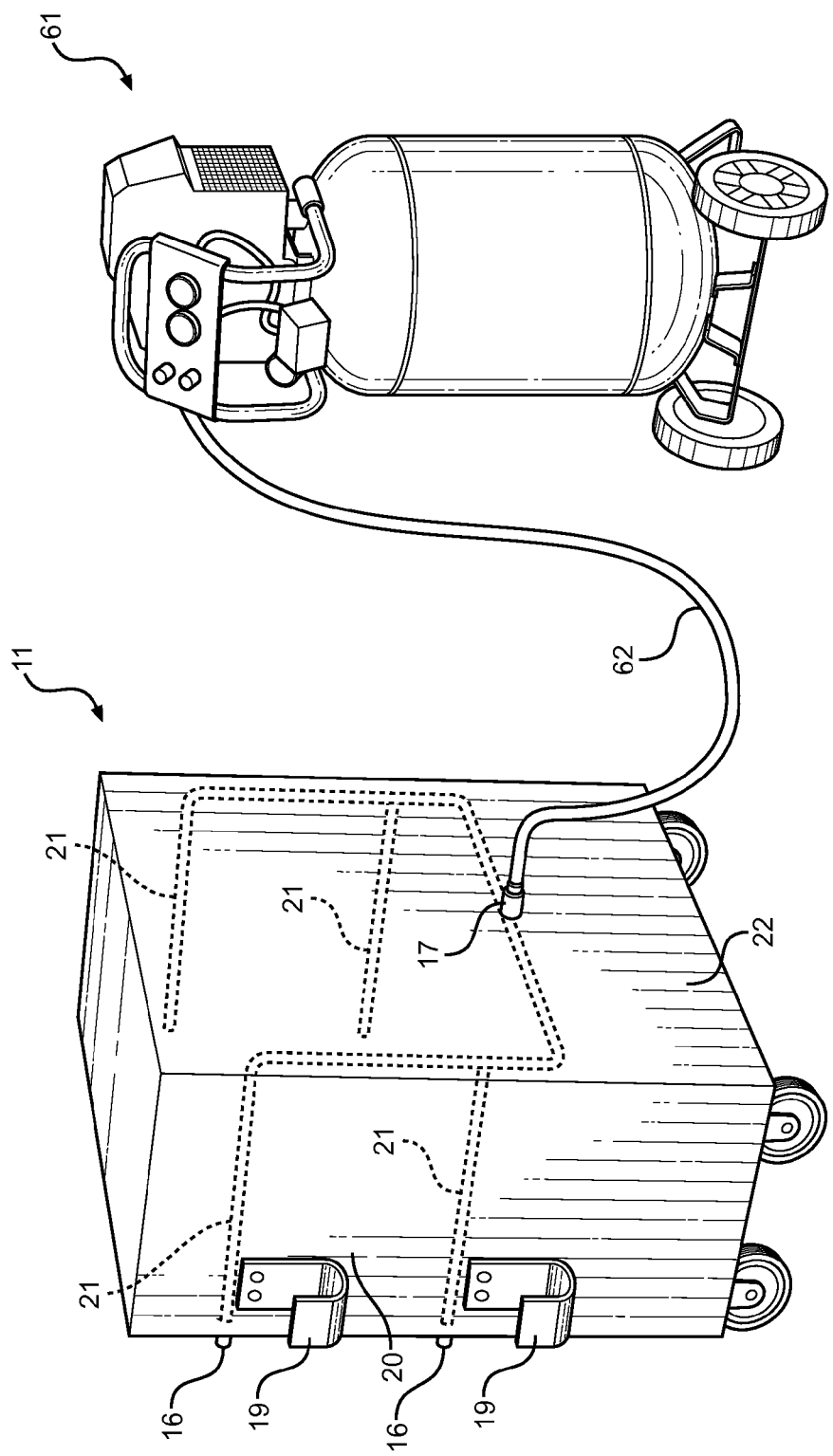
FIG. 2 shows a perspective cutaway view of the rear portion of the present invention having an air compressor connected thereto.

Referring now to FIGS. 1 and 2, there are shown a perspective view of the present invention having a plurality of pneumatic tools connected thereto and a perspective cutaway view of the rear portion of the present invention having an air compressor connected thereto. The present invention comprises a tool cabinet 11 having a plurality of integral air lines 21 affixed to the interior surface of the tool cabinet 11. The tool cabinet 11 comprises a body having an interior volume, a plurality of drawers 13 slidably disposed within said body, and a plurality of wheels 14 affixed to the bottom portion of the body. As depicted, the tool cabinet 11 comprises a plurality of sidewalls, a top surface, and a bottom surface; however, no claim is made as to a specific shape or configuration of the tool cabinet 11. The drawers 13 comprise a variety of different sizes, depths, and configurations. The drawers 13 comprise any known type of configuration for supporting and organizing tools therein. Alternative embodiments of the present invention comprise additional structures for holding and organizing tools, such as slots, hooks, pegs, and the like in addition to, or in lieu of, the drawers 13. No claim is made as to a specific configuration or arrangement of the holding and organizing mechanisms utilized by the present invention. The wheels 14 comprise metal casters and other such wheels adapted to support the weight of a metal tool cabinet 11 and the tools stored therein and thereon. The tool cabinet 11 is constructed from steel, or other such durable material.

The present invention comprises a plurality of integral air lines 21 that split from an inlet valve 17 to which an air compressor 61 may be attached via an air hose 62. The integral air lines 21 are disposed within the interior of the tool cabinet 11 and extend along the interior surface of the sidewalls of the tool cabinet 11. The integral air lines 21 comprise rubber, PVC, rubber-PVC hybrid, polyurethane, and other such durable materials that are adapted to withstand working pressures commonly used by pneumatic tools, which is generally approximately 90 PSI. The integral air lines 21 are affixed to the interior surface of the tool cabinet 11 via fasteners, adhesive, welding, or any other such means that holds the integral air lines 21 fixedly in place. The inlet valve 17 comprises any type of coupling known in the prior art that is adapted to connect to an air hose.

The integral air lines 21 further comprise outlet valves 16 disposed on the exterior of the body 12 of the tool cabinet 11. The outlet valves 16 are check valves that prevent air from a compressor 61 attached to the present invention from escaping when pneumatic tools 51 are attached thereto via air hoses 15. The outlet valves 16 comprise any type of coupling known in the prior art that is adapted to connect to an air hose. In the depicted embodiment of the present invention, the inlet valve 17 is disposed on the rear surface 22 of the tool cabinet 11 and the outlet valves 16, of which four are depicted, are disposed on the front surface 12 of the tool cabinet; however, no claim is made as to the precise number or arrangement of outlet or inlet valves 16, 17. However, the outlet valves 16 are preferably disposed on the tool cabinet 11 to avoid interference between the drawers 13 and any pneumatic tools 51 or air hoses 15 connected thereto. In embodiments of the present invention comprising a single inlet valve 17 and multiple outlet valves 16, the integral air lines 21 form a continuous, branched connection therebetween. This allows a single compressor 61 to simultaneously provide supply to a plurality of pneumatic tools 51 via a single connection.

The present invention further comprises a plurality of holders 19 attached to the exterior surface of the tool cabinet 11. The holders 19 comprise U-shaped hooks, loops, clips, slots, or any other such structure adapted to removably hold a pneumatic tool 51 in position. As depicted, the holders 19 extend from the lateral surfaces 20 of the tool cabinet 11; however, no claim is made as to a specific positioning for the holders 19. The holders 19 are preferably positioned adjacently to the outlet valves 16 so that the pneumatic tools 51 are held in a convenient position that does not force the air house 15 to bend of obstruct the use of the tool cabinet 11.

The present invention provides a convenient means for simultaneously powering and supporting a plurality of pneumatic tools 51, such as impact wrenches, pneumatic drills, pneumatic ratchets, and the like. By providing a single structure that powers and supports pneumatic tools, while also acting as a conventional tool cabinet 11 that is adapted to hold all types of tools, the present invention ensures that all of an individual's tools are readily available for immediate use. The present invention also ensures that individuals do not leave their pneumatic tools on the ground or in other potentially dangerous locations.

In an alternative embodiment, the present invention is a tool box, rather than a tool cabinet. As with the tool cabinet 11 embodiment, this embodiment of the present invention comprises an inlet valve 17 to which an air compressor 61 may be removably attached, at least one integral air line 21, at least one outlet valve 16, holders 19 for the pneumatic tools, and other holding mechanisms for tools, such as trays, drawers, and the like. The aforementioned embodiment of the present invention is different only in that the device is a tool box or other such storage device, rather than a tool cabinet, and otherwise comprises all of the previously described elements of the present invention.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool cabinet comprising:
   a housing including a plurality of sidewalls forming an enclosed interior volume;
   a drawer slidably mounted within the housing;
   at least one outlet valve disposed on an exterior surface of the housing;

at least one inlet valve disposed on the exterior surface;
wherein the outlet valve and the inlet valve are disposed on opposite sidewalls of the housing;
an air line extending along an interior surface of at least one of the plurality of sidewalls between the at least one outlet valve and the at least one inlet valve;
each of the at least one outlet valve including a check valve, the check valve configured to selectively allow air to pass therethrough; and
each of the at least one outlet valve and the at least one inlet valve including a coupling, the coupling configured to engage an air hose.

2. The tool cabinet of claim 1, further comprising at least one holder disposed on said exterior surface.

3. The tool cabinet of claim 2, wherein said at least one holder is disposed adjacently to said at least one outlet valve.

4. The tool cabinet of claim 2, wherein said at least one holder comprises a U-shaped hook.

5. The tool cabinet of claim 1, wherein:
said at least one inlet valve numbers one;
said at least one outlet valve numbers two or more;
the airline forming a branched connection between said inlet valve and said outlet valves.

6. The tool cabinet of claim 1, further comprising wheels disposed on a bottom surface of the housing.

7. The tool cabinet of claim 1, wherein each of the at least outlet valve is positioned adjacently to the drawer.

* * * * *